United States Patent
Aggarwal et al.

(10) Patent No.: US 12,477,337 B2
(45) Date of Patent: Nov. 18, 2025

(54) ACCESS TOKEN REVOCATION IN SECURITY MANAGEMENT

(71) Applicant: Nokia Technologies Oy, Espoo (FI)

(72) Inventors: Chaitanya Aggarwal, Munich (DE); Saurabh Khare, Bangalore (IN); Gerald Kunzmann, Augsburg (DE); Iris Adam, Munich (DE)

(73) Assignee: Nokia Technologies Oy, Espoo (FI)

( * ) Notice: Subject to any disclaimer, the term of this patent is extended or adjusted under 35 U.S.C. 154(b) by 142 days.

(21) Appl. No.: 18/337,194

(22) Filed: Jun. 19, 2023

(65) Prior Publication Data
US 2023/0413052 A1    Dec. 21, 2023

(30) Foreign Application Priority Data

Jun. 20, 2022   (IN) .............................. 202241035289

(51) Int. Cl.
*H04W 12/082* (2021.01)
*H04W 12/084* (2021.01)

(52) U.S. Cl.
CPC ....... *H04W 12/082* (2021.01); *H04W 12/084* (2021.01)

(58) Field of Classification Search
CPC ......... H04L 67/02; H04L 63/10; H04L 63/08; H04L 63/102; H04W 12/06; H04W 12/084; H04W 12/08; H04W 12/082; G06F 21/44
See application file for complete search history.

(56) References Cited

U.S. PATENT DOCUMENTS

| 10,404,477 | B1 * | 9/2019 | Deck ...................... H04L 9/3247 |
| 11,063,925 | B1 * | 7/2021 | Vera ..................... H04L 63/0884 |
| 11,615,206 | B2 * | 3/2023 | Watkins .............. G06F 21/6245 726/26 |
| 2004/0153667 | A1 * | 8/2004 | Kastelewicz ......... H04W 12/06 726/9 |
| 2013/0191884 | A1 * | 7/2013 | Leicher .................. H04L 63/08 726/4 |

(Continued)

FOREIGN PATENT DOCUMENTS

EP   2925037 A1 *  9/2015   ......... G06F 21/6245

OTHER PUBLICATIONS

"3rd Generation Partnership Project; Technical Specification Group Services and System Aspects; Security architecture and procedures for 5G system (Release 17)", 3GPP TS 33.501, V17.5.0, Mar. 2022, pp. 1-293.

(Continued)

*Primary Examiner* — Lizbeth Torres-Diaz
(74) *Attorney, Agent, or Firm* — Duft & Bornsen, PC (57) ABSTRACT

Example embodiments of the present disclosure relate to access token revocation in security management. In an example method, in response to providing, to a second device, an access token for the second device to access a NF service from a third device, a first device stores a mapping indicating an association among the access token, the second device and the third device. In response to determining that the second device is abnormal, the first device sends, to at least one target device based on the mapping, an indication of revoking the access token. In this way, at least one target device associated with revoked access token can be informed and potential damage caused by the abnormal NF can be eliminated.

18 Claims, 6 Drawing Sheets

(56) References Cited

U.S. PATENT DOCUMENTS

| | | | | |
|---|---|---|---|---|
| 2014/0237553 | A1* | 8/2014 | Feuer | H04L 63/10 |
| | | | | 726/4 |
| 2015/0039444 | A1* | 2/2015 | Hardin | G06Q 20/384 |
| | | | | 705/14.69 |
| 2016/0226859 | A1* | 8/2016 | Sondhi | H04W 12/06 |
| 2016/0261425 | A1* | 9/2016 | Horton | H04L 67/1097 |
| 2017/0026369 | A1* | 1/2017 | Hao | H04L 63/0876 |
| 2023/0132478 | A1* | 5/2023 | Robinson | H04L 63/205 |
| | | | | 726/22 |
| 2023/0239288 | A1* | 7/2023 | Zhou | H04L 63/0815 |
| | | | | 726/9 |

OTHER PUBLICATIONS

"3rd Generation Partnership Project; Technical Specification Group Services and System Aspects; Study on security aspects of enablers for Network Automation for 5G—phase 3; (Release 18)", 3GPP TR 33.738, V0.1.0, May 2022, pp. 1-10.

"Study on Zero Trust Security", 3GPP TSG-SA3 Meeting #107-e, S3-221172, Agenda Item: 6, Lenovo, May 16-20, 2022, 3 pages.

"OAuth 2.0", Oauth, Retrieved on Jul. 26, 2023, Webpage available at : https://oauth.net/2/.

"3rd Generation Partnership Project; Technical Specification Group Services and System Aspects; Study on applicability of the Zero Trust Security principles in mobile networks (Release 18)", 3GPP TR 33.894 , V0.5.0, Feb. 2023, pp. 1-15.

* cited by examiner

ACCESS TOKEN REVOCATION IN SECURITY MANAGEMENT

FIELD

Example embodiments of the present disclosure generally relate to the field of telecommunication, and in particular, to network devices, methods, apparatuses and a computer readable storage medium for access token revocation in security management.

BACKGROUND

The 5G Service-Based Architecture (SBA) has been defined to enable flexible and scalable deployments using virtualization and container technologies and cloud-based processing platforms. In the 5G SBA, services are modeled as network functions (NFs) that communicate with each other using application programming interfaces (APIs).

However, the use of virtualized implementation and cloud processing also puts higher and different requirements on security. For example, authorization of access to NF services needs to be well investigated.

SUMMARY

In general, example embodiments of the present disclosure provide a solution for access token revocation in security management.

In a first aspect, there is provided a first device. The first device comprises at least one processor; and at least one memory including computer program code; wherein the at least one memory and the computer program code are configured to, with the at least one processor, cause the first device to: in response to providing, to a second device, an access token for the second device to access a network function (NF) service from a third device, store a mapping indicating an association among the access token, the second device and the third device; and in response to determining that the second device is abnormal, send, to at least one target device based on the mapping, an indication of revoking the access token.

In a second aspect, there is provided a network device. The network device comprises at least one processor; and at least one memory including computer program code; wherein the at least one memory and the computer program code are configured to, with the at least one processor, cause the network device to: send, to a first device, a callback uniform resource identifier (URI); and receive, from the first device and based on the callback URI, an indication that a received access token is revoked, the access token being previously received for accessing a network function (NF) service.

In a third aspect, there is provided a network device. The network device comprises at least one processor; and at least one memory including computer program code; wherein the at least one memory and the computer program code are configured to, with the at least one processor, cause the network device to: send, to a first device, a callback uniform resource identifier (URI); and receive, from the first device and based on the callback URI, an indication of ignoring an access token from a second device, the access token being used for the second device to access a network function (NF) service.

In a fourth aspect, there is provided a method performed by a first device. The method comprises: in response to providing, to a second device, an access token for the second device to access a network function (NF) service from a third device, storing, at a first device, a mapping indicating an association among the access token, the second device and the third device; and in response to determining that the second device is abnormal, sending, from the first device and to at least one target device based on the mapping, an indication of revoking the access token.

In a fifth aspect, there is provided a method performed by a network device. The method comprises: sending, from a network device and to a first device, a callback uniform resource identifier (URI); and receiving, at the network device and from the first device, an indication that a received access token is revoked based on the callback URI, the access token being previously received for accessing a network function (NF) service.

In a sixth aspect, there is provided a method performed by a network device. The method comprises: sending, from a network device and to a first device, a callback uniform resource identifier (URI); and receiving, at the network device and from the first device, an indication of ignoring an access token from a second device based on the callback URI, the access token being used for the second device to access a network function (NF) service.

In a seventh aspect, there is provided an apparatus. The apparatus comprises: means for in response to providing, to a second device, an access token for the second device to access a network function (NF) service from a third device, storing, at a first device, a mapping indicating an association among the access token, the second device and the third device; and means for in response to determining that the second device is abnormal, send, from the first device and to at least one target device based on the mapping, an indication of revoking the access token.

In an eighth aspect, there is provided an apparatus. The apparatus comprises: means for sending, from a network device and to a first device, a callback uniform resource identifier (URI); and means for receiving, at the network device and from the first device, an indication that a received access token is revoked based on the callback URI, the access token being previously received for accessing a network function (NF) service.

In a ninth aspect, there is provided an apparatus. The apparatus comprises: means for sending, from a network device and to a first device, a callback uniform resource identifier (URI); and means for receiving, at the network device and from the first device, an indication of ignoring an access token from a second device based on the callback URI, the access token being used for the second device to access a network function (NF) service.

In a tenth aspect, there is provided a non-transitory computer readable medium comprising program instructions for causing an apparatus to perform at least the method in the fourth, fifth and sixth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, the use of virtualized implementation and cloud processing puts higher and different requirements on security in the 5G SBA. SBA security has been specified in 3GPP TS 33.501. Specifically, the SBA security specification details security for direct and indirect communication between NFs based on Token-based authorization using OAuth 2.0.

The Token-based authorization using OAuth 2.0 is based on a central authorization server (i.e., Network Repository Function, NRF, in the SBA) that issues access token(s) to a client (i.e., NF service consumer in the SBA) after authentication of the client. The authorization rules can be provided by the NF service producer during its registration at the NRF. With the access token, the client sends a service request to the NF service producer and the NF service producer grants the NF service consumer access to its services after validating the access token.

However, the access token once generated is currently long lived. In this case, if a NF in possession of a valid access token is detected as being abnormal, there is no mechanism to revoke the access token and inform associated device(s) that the access token is revoked. Thus it is difficult to avoid damage that the abnormal NF may cause other than completely removing the NF.

In order to solve at least part of the above problems and other potential problems, solutions on access token revocation in security management are proposed. According to embodiments of the present disclosure, in response to providing, to a second device, an access token for the second device to access a NF service from a third device, a first device stores a mapping indicating an association among the access token, the second device and the third device. In response to determining that the second device is abnormal, the first device sends, to at least one target device based on the mapping, an indication of revoking the access token.

In this way, when a device in possession of a valid access token is detected as being abnormal, an indication of revoking the access token can be sent to one or more target devices associated with the access token. Thus the access token can be revoked and potential damage caused by the abnormal NF can be eliminated.

Figure 1:
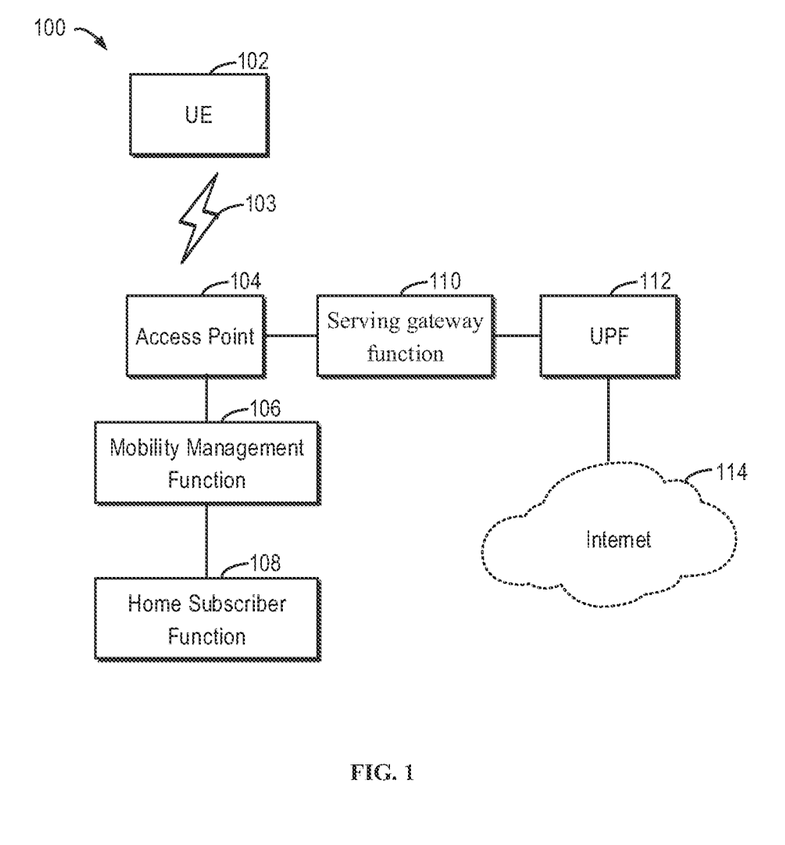
FIG. 1 illustrates an example of a communication system in which some example embodiments of the present disclosure may be implemented.

FIG. 1 illustrates an example of a communication system 100 in which some example embodiments of the present disclosure may be implemented. It is to be understood that network elements shown in the communication system 100 are intended to represent main functions provided within the system, e.g., UE access functions, mobility management functions, authentication functions, serving gateway functions, etc. However, other network elements may also be used to implement some or all of the main functions represented. Also, it is to be understood that not all functions of a 5G network are depicted in FIG. 1.

As shown in FIG. 1, the communication system 100 comprises UE 102 that communicates via an air interface 103 with an access point 104. The UE 102 in some embodiments is a mobile station, and such a mobile station may comprise, by way of example, a mobile telephone, a computer, or any other type of communication device.

The access point 104 is illustratively as part of an access network of the communication system 100. Examples of the access network may comprise a 5G System having a plurality of base stations and one or more associated radio network control functions. The access point 104 in this illustrative embodiment is operatively coupled to a mobility management function 106. In a 5G network, the mobility management function 106 is implemented by an Access and Mobility Management Function (AMF). A Security Anchor Function (SEAF) may be also implemented with the AMF.

The mobility management function 106 in this illustrative embodiment is operatively coupled to a home subscriber function 108. Examples of the home subscriber function 108 may comprise a Unified Data Management (UDM) function, an Authentication Server Function (AUSF), a Network Slice Selection Function (NSSF), a Network Exposure Function (NEF), a Network Repository Function (NRF), a Policy Control Function (PCF), and an Application Function (AF).

The access point 104 is also operatively coupled to a serving gateway function 110 (e.g., Session Management Function (SMF)), which is operatively coupled to a User Plane Function (UPF) 112. UPF 112 is operatively coupled to a Packet Data Network, e.g., Internet 114. Further typical operations and functions of such network elements are not described herein.

It is to be appreciated that this particular arrangement of system elements is an example only, and other types and arrangements of additional or alternative elements can be used to implement a communication system in other embodiments.

Figure 2:
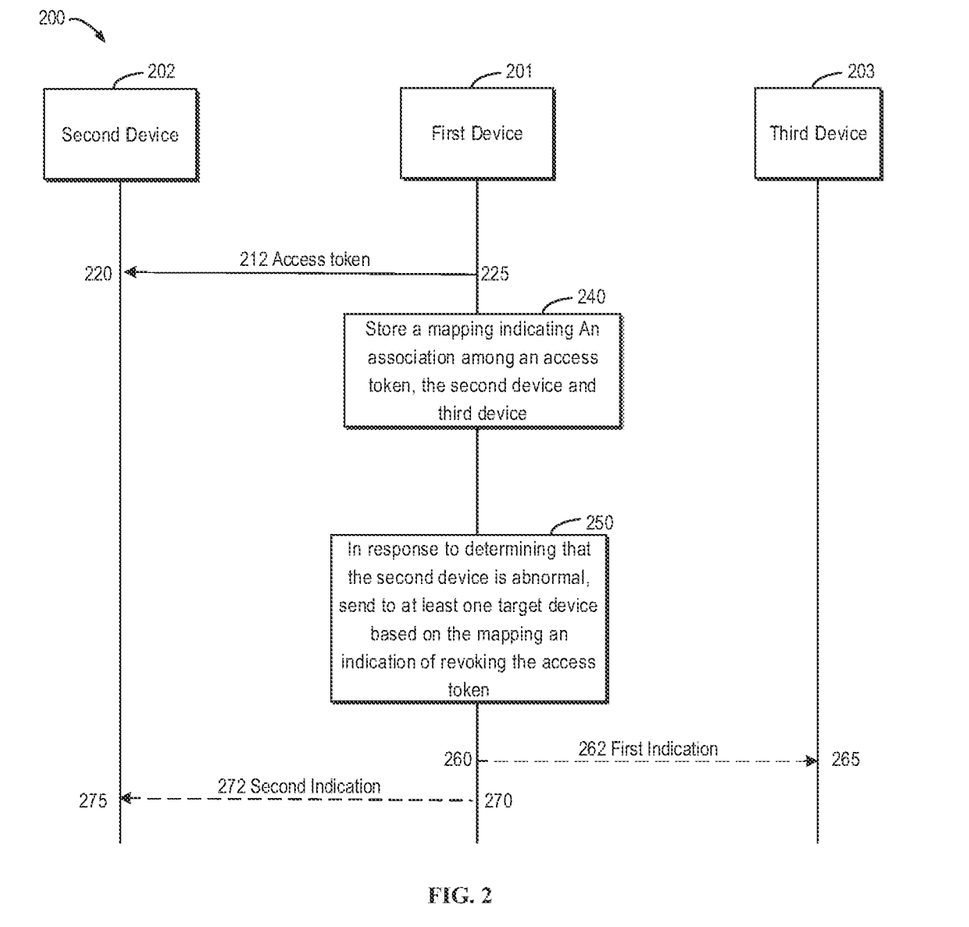
FIG. 2 illustrates an example of a process flow for access token revocation in accordance with some example embodiments of the present disclosure.

FIG. 2 illustrates an example of a process flow 200 for access token revocation in accordance with some example embodiments of the present disclosure. It would be appreciated that the process flow 200 may be applied to the communication system 100 of FIG. 1 and any other similar communication scenarios.

In the process flow 200, a first device 201 stores (240) a mapping in response to providing (225) an access token 212 to a second device 202. The access token 212 is used for the second device 202 to access a NF service from the third device 203. The mapping indicates an association among the access token 212, the second device 202 and the third device 203.

In some embodiments, the first device 201 may be a NRF. The first device 201 may be any other suitable authorization server which generates the access token 212 and manages the security of service access between NFs. The second device 202 may be a NF service consumer or any other suitable NF which requests the access token 212 for accessing service from another NF.

In some embodiments, the access token 212 may be bound to a specific NF service producer offering the NF service. In this case, the third device 203 may be the specific NF service producer indicated by the access token 212. Alternatively, the access token 212 may be bound to a number of NF service producers of a specific NF type. In this case, the third device 203 may be one of a number of NF service producers of a specific NF type indicated by the access token 212. Alternatively, the access token 212 may be bound to a specific NF set. In this case, the third device 203 may be a NF service producer of a specific NF set indicated by the access token 212.

In some embodiments, the mapping may indicate the association by comprising information about the access token 212, the NF service consumer for which the access token 212 was generated and the target NF service producer(s). The mapping may further comprise information about a Service Communication Proxy (SCP) verifying the access token 212 on behalf of the NF service producer. Alternatively or in addition, the mapping may further comprise information about a Security Edge Protection Proxy (SEPP) handling traffic from a public land mobile network (PLMN) associated with the NF service consumer. Alternatively or in addition, the mapping may further comprise expiry time of the access token 212.

In response to determining that the second device 202 is abnormal, the first device 201 sends (250), to at least one target device based on the mapping, an indication of revoking the access token 212.

In some embodiments, the first device 201 may determine that the second device 202 is abnormal by receiving an indication that the second device 202 is abnormal from a network device which performs analysis and/or management of network. Examples of the network device may comprise a network data analytics function (NWDAF), a management data analytics service (MDAS), or an operations, administration and maintenance (OAM) function.

For example, the NRF may subscribe to Abnormal NF event ID at the NWDAF or MDAS for any NF instance. The NWDAF keeps on collecting data from the network and notifies the NRF the NF Instance ID which is malicious, along with information such as confidence of the report. Alternatively, The OAM may mark the NF service consumer as malicious and inform the NRF. The OAM may also mark roaming NF (which is sending lots of traffic or misbehaving) as being malicious and inform the NRF.

In some embodiments, in response to determining that the second device 202 is abnormal, the first device 201 may determine at least one target device based on the mapping. The first device 201 may store a plurality of mappings each corresponding to a generated access token. The first device 201 may identify the mapping associated with the abnormal second device 202 from the plurality of mappings and then determine the at least one target device to be sent the indication of revoking the access token 212.

In some embodiments, the at least one target device may comprise the second device 203, i.e., the specific NF service producer or one of the NF service producers of the NF type or a NF service producer of the specific NF set. Alternatively or in addition, the at least one target device may comprise a proxy verifying the access token 212 from the second device 202 on behalf of the third device 203.

As mentioned above, when a NF service is requested, the access token needs to be validated or verified before execution of the requested service. In some embodiments, in direct communication between NFs, the third device 203 may verify the access token 212. The third device 203 may verify the access token by ensuring the integrity of the access token and checking the claims in the access token. If the verification is successful, the third device 203 may execute the requested service and responds back to the second device 202.

In some embodiments, in indirect communication between NFs, a Service Communication Proxy (SCP) in the path between the second device 202 and third device 203 may verify the access token on behalf of the third device 203. The SCP may register with the first device 201. For example, information about the SCP may be provided when the third device 203 is registering with the first device 201.

In some embodiments, in a configuration (also referred to as inter-PLMN communication) comprising a visited public land mobile network (VPLMN) operatively coupled via an intermediate Internetwork Packet Exchange (IPX) network to a home public land mobile network (HPLMN), a Security Edge Protection Proxy (SEPP) at edge of the HPLMN may verify the access token on behalf of the third device 203.

In some embodiments, the first device 201 may send the indication of revoking the access token 212 by sending (260) a first indication 262 of ignoring the access token 212 from the second device 202 to at least one of the third device 203, the SCP or the SEPP of the HPLMN associated with the third device 203. The third device 203 may receive (265) the first indication 262. The first indication 206 of ignoring the access token 212 may indicate not processing the access token 212 such as ensuring the integrity and checking the claims in the access token.

In some embodiments, the first device 201 may send the first indication 262 based on a first callback uniform resource identifier (URI). The first device 201 may receive the first callback URI from the third device 203 when the third device 203 registers with the first device 201. Alternatively, the first device 201 may receive the first callback URI from the proxy verifying the access token on behalf of the third device 203 when the proxy registers with the first device 201. Examples of the proxy may comprise the SCP and the SEPP.

In some embodiments, in response to determining that the access token 212 is generated for a second PLMN different from a first PLMN associated with the first device, the first device 201 may send, to a SEPP associated with the first device 201, a third indication of blocking traffic from the second PLMN. The traffic to be blocked may be traffic or message that contains the access token.

In some embodiments, the at least one target device may comprise the second device 202, e.g., the NF service consumer. Alternatively or in addition, the at least one target device may comprise a SCP requesting the access token on behalf of the second device 202. The SCP may receive a service request from the second device 202 and forward the service request to the third device 203.

In some embodiments, the first device 201 may send the indication of revoking the access token 212 by sending (270) a second indication 272 that the access token 212 is revoked to at least one of the second device 202 or the SCP on behalf of the second device 202. The second device 202 may receive (275) the second indication 272.

In some embodiments, the first device 201 may send the second indication 272 based a second callback URI. The first device 201 may receive the second callback URI from the second device 202 when the second device 202 requests the access token 212 from the first device 201. Alternatively, the first device 201 may receive the second callback URI from the SCP requesting the access token on behalf of the second device 202 when the SCP requests the access token from the first device 201.

In some embodiments, the first device 201 may further reject a further access token request for the second device 202. The further access token request may be sent by the second device 202 or the SCP requesting the access token 212 on behalf of the second device 202.

In some embodiments, the first device 201 may reject the further access token request by not processing the further access token request. For example, the first device 201 may not verify whether input parameters (e.g., NF type) in the access token request match with the corresponding ones in the public key certificate of the second device 202 or those in the NF profile of the second device 202. The first device 201 may not check whether the second device 202 is authorized to access the requested service(s). The first device 201 may not generate an access token for the further access token request.

In some embodiments, in the inter-PLMN communication, the first device 201 in the VPLMN may reject the further access token request by not forwarding the further access token request to another NRF in the HPLMN.

In some embodiments, the first device 201 may further send an error code in response to receiving a further access token request for the second device 202.

In some embodiments, the first device 201 may further discard the mapping in response to expiry of the access token. The expiry time of the access token may be indicated in the access token and/or in the mapping.

Through the process flow 200, at least one target device associated with revoked access token can be informed and potential damage caused by the abnormal NF can be eliminated.

Figure 3:
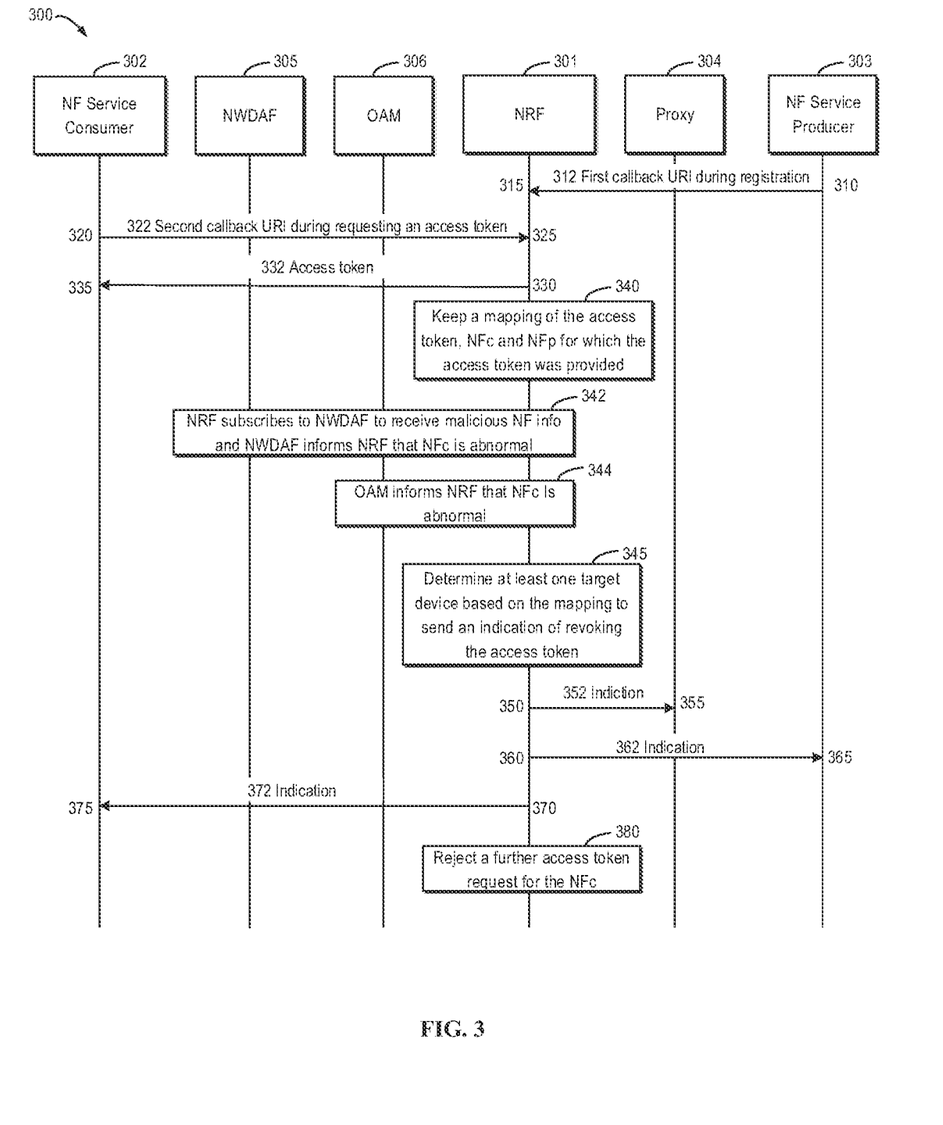
FIG. 3 illustrates another example of a process flow for access token revocation in accordance with some example embodiments of the present disclosure.

FIG. 3 illustrates another example of a process flow 300 for access token revocation in accordance with some example embodiments of the present disclosure. It is noted that the process flow 300 can be deemed as a more specific example of the process flow 200. It would be appreciated that the process flow 300 may be applied to the communication system 100 of FIG. 1 and any other similar communication scenarios.

As shown in FIG. 3, NRF 301, NF service consumer 302, NF service producer 303, Proxy 304, NWDAF 305 and OAM 306 may be utilized to implement the solution of access token revocation as described with reference to FIG. 2. The NRF 301 may be an example of the first device 201, the NF service consumer 302 may be an example of the second device 202, and the NF service producer 303 may be an example of the third device 203.

In the process flow 300, the NF service producer 303 (also referred to as NFp) sends (310) a first callback URI 312 when registering with the NRF 301. The NRF 301 receives (315) the first callback URI from the NF service producer 303. Alternatively, the proxy 304, e.g., a SCP or a SEPP associated with the NF service producer 303 may send a first callback URI to the NRF 301 when registering with the NRF 301 (not shown in FIG. 3).

The NF service consumer 302 (also referred to as NFc) sends (320) a second callback URI 322 when requesting an access token from the NRF 301. The NRF 301 receives (325) the second callback URI from the NF service consumer 302. Alternatively, a SCP associated with the NF service consumer 302 may send a second callback URI to the NRF 301 when requesting an access token from the NRF 301 (not shown in FIG. 3).

The NRF 301 generates and sends (330) an access token 332 to the NF service consumer 302 after verifying the access token request. The NF service consumer 302 receives (335) the access token 332 from the NRF 301. Alternatively, the NRF 301 may send the generated access token to a SCP requesting the access token on behalf of the NF service consumer 302 and the SCP may forward the generated access token to the NF service consumer 302 (not shown in FIG. 3).

The NRF 301 keeps (340) a mapping of the generated access token, NFc and NFp for which the access token 332 was provided. In other words, the NRF 301 stores a mapping indicating an association among the access token 332, the NFc 302 and the NFp 303 in response to providing the access token 332 to the NF service consumer 302 and/or a SCP associated with the NF service consumer 302.

The NRF 301 may subscribe to Abnormal NF event ID at the NWDAF or MDAS for any NF instance and NWDAF 305 informs (342) the NRF 301 that the NF service consumer 302 is abnormal. The NWDAF 305 may keep on collecting data from the network and notifies the NRF 301 the NF Instance ID which is malicious, along with information such as confidence of the report.

The NRF 301 may be informed that the NF service consumer 302 is malicious. Alternatively or in addition, OAM 306 informs (344) the NRF 301 that the NF service consumer 302 is abnormal.

In response to determining that the NF service consumer 302 is abnormal, the NRF 301 determines (345) at least one target device based on the mapping to send an indication of revoking the access token 332. The NRF 301 may identify the mapping associated the malicious NF service consumer 302 from a plurality of stored mappings and then determine the at least one target device associated with the malicious NF service consumer 302.

The NRF 301 sends (350) an indication 352 of ignoring the access token from the NF service consumer 302 (or the SCP associated with the NF service consumer 302) to the proxy 304. The NRF 301 sends (350) the indication 352 based on the first callback URI 312. The proxy 304 receives (355) the indication 352. In some embodiments, the proxy 304 may be the SCP associated with the NF service producer 303. The indication 352 may indicate not processing the access token 332 from the NF service consumer 302. Alternatively, in the inter-PLMN communication, the proxy 304 may be the SEPP associated with the NF service producer 303. The indication 352 may indicate blocking traffic (e.g. traffic/message that contains the access token 332) from a PLMN associated with the NF service consumer 302.

Alternatively or in addition, the NRF 301 sends (360) an indication 362 of ignoring the access token from the NF service consumer 302 (or the SCP associated with the NF service consumer 302) to the NF service producer 303. The NRF 301 sends (360) the indication 362 based on the first callback URI 312. The NF service producer 303 receives (365) the indication 362.

Alternatively or in addition, the NRF 301 sends (370) an indication 372 that the access token 332 is revoked to the NF service consumer 302. Alternatively, the NRF 301 may send the indication 372 to the SCP associated with the NF service consumer 302 and the SCP may forward the indication 372 to the NF service consumer 302 (not shown in FIG. 3). The NF service consumer 302 receives (375) the indication 372 and may not use the revoked access token to request NF service(s).

The NRF 301 rejects (380) a further access token quest for the NF service consumer 302. In some embodiments, the NRF 301 may not verify the further access token request for the NF service consumer 302 from the NF service consumer 302 or the SCP associated with the NF service consumer 302. Alternatively, in the inter-PLMN communication, the NRF 301 may not forward the received access token request to another NRF in the HPLMN associated with the NF service producer 303.

Through the process flow 300, the NF service consumer 302 requesting the access token and the NF service producer 303 (and/or the proxy 304) verifying the access token may be indicated that the access token is not valid anymore, thereby avoiding damage caused from abnormal NF service consumer.

Figure 4:
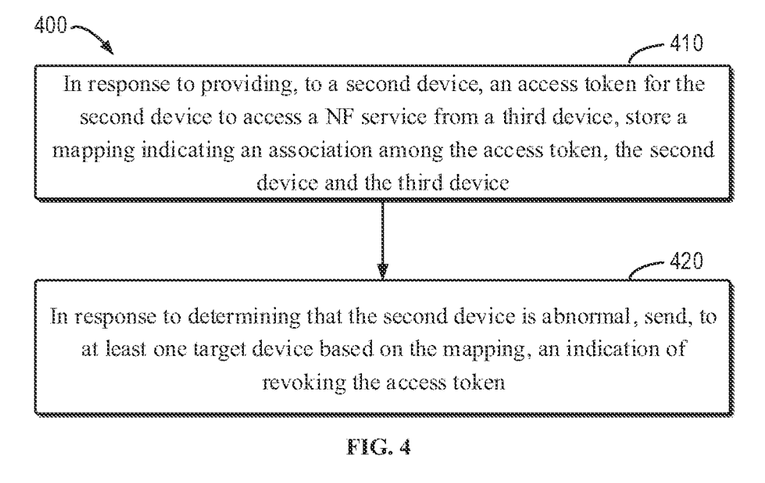
FIG. 4 illustrates a flowchart of a method of access token revocation by a first device providing an access token in accordance with some example embodiments of the present disclosure.

FIG. 4 illustrates a flow chart of method 400 of access token revocation by a first device providing an access token according to embodiments of the present disclosure. The method 400 can be implemented at any suitable devices. For example, the method may be implemented at the first device 201 as described with reference to FIG. 2.

At block 410, in response to providing, to a second device, an access token for the second device to access a NF service from a third device, a first device stores a mapping indicating an association among the access token, the second device and the third device.

In some embodiments, the second device is a NF service consumer and wherein the third device is a specific NF service producer, one of a number of NF service producers of a specific NF type, or a NF service producer of a specific NF set.

At block 420, in response to determining that the second device is abnormal, the first device sends, to at least one target device based on the mapping, an indication of revoking the access token.

In some embodiments, the first device may send a first indication of ignoring the access token from the second device to at least one of the third device or a proxy verifying the access token from the second device on behalf of the third device.

In some embodiments, the first device may receive a first callback uniform resource identifier (URI) from the third device while the third device registers with the first device, or receive a first callback URI from a proxy verifying the access token from the second device on behalf of the third device while the proxy registers with the first device.

In some embodiments, the first device may send the first indication by sending the first indication based on the first callback URI.

In some embodiments, the first device may send the indication by sending a second indication that the access token is revoked to at least one of the second device or a service communication proxy requesting the access token from the first device on behalf of the second device.

In some embodiments, the first device may receive, from the second device, a second callback URI while the second device requests the access token from the first device, or receive, from a service communication proxy requesting the access token from the first device on behalf of the second device, a second callback URI while the service communication proxy requests the access token from the first device.

In some embodiments, the first device may send the second indication by sending the second indication based on the second callback URI.

In some embodiments, the first device may send the indication by: in response to determining that the access token is generated for a second public land mobile network (PLMN) different from a first PLMN associated with the first device, sending, to a security edge protection proxy associated with the first PLMN, a third indication of blocking traffic (e.g. traffic/message that contains the access token) from the second PLMN.

In some embodiments, the first device may perform at least one of: discarding the mapping in response to expiry of the access token, rejecting a further access token request for the second device, or sending an error code in response to receiving a further access token request for the second device.

In some embodiments, the first device may determine that the second device is abnormal by: receiving, from a network device, an indication that the second device is abnormal. In some embodiments, the network device may comprise at least one of: a network data analytics function (NWDAF), a management data analytics service (MDAS), or an operations, administration and maintenance (OAM) function.

Figure 5:
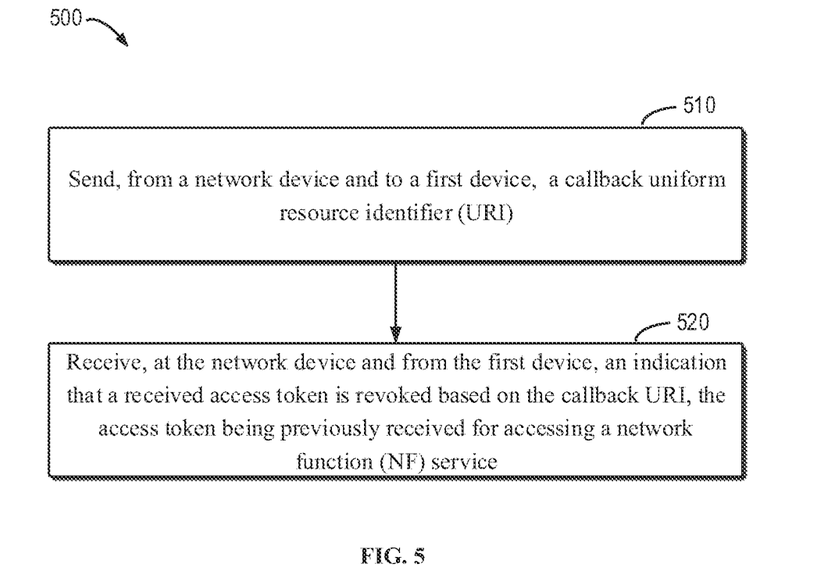
FIG. 5 illustrates a flowchart of a method of access token revocation by a network device requesting an access token in accordance with some example embodiments of the present disclosure.

FIG. 5 illustrates a flow chart of method 500 of access token revocation by a network device requesting an access token according to embodiments of the present disclosure. The method 500 can be implemented at any suitable devices. For example, the method may be implemented at the second device 202 as described with reference to FIG. 2.

At block 510, the network device sends a callback URI to a first device. The first device may be similar to the first device 201 as described with reference to FIG. 2.

In some embodiments, the network device may send the callback URI while requesting the access token from the first device.

At block 520, the network device receives, from the first device and based on the callback URI, an indication that a received access token is revoked, the access token being previously received for accessing a network function (NF) service.

In some embodiments, the network device is a NF service consumer or a service communication proxy requesting the access token on behalf of a NF service consumer.

In this way, the network device requesting the access token may be indicated that the access token is not valid anymore, thereby avoiding damage caused from abnormal NF service consumer.

Figure 6:
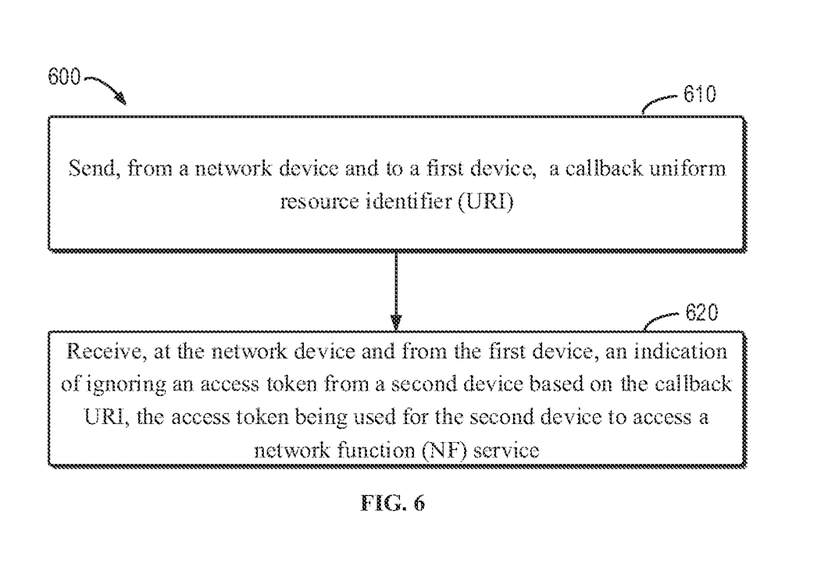
FIG. 6 illustrates a flowchart of a method of access token revocation by a network device verifying an access token in accordance with some example embodiments of the present disclosure.

FIG. 6 illustrates a flow chart of method 600 of access token revocation by a network device verifying an access token according to embodiments of the present disclosure. The method 600 can be implemented at any suitable devices. For example, the method may be implemented at the third device 203 as described with reference to FIG. 2.

At block 610, the network device sends a callback URI to a first device. The first device may be similar to the first device 201 as described with reference to FIG. 2. The second device may be similar to the second device 202 as described with reference to FIG. 2.

In some embodiments, the network device may send the callback URI while registering with the first device.

At block 620, the network device receives, from the first device and based on the callback URI, an indication of ignoring an access token from a second device, the access token being used for the second device to access a network function (NF) service.

In some embodiments, the network device is a NF service producer or a proxy verifying the access token on behalf of a NF service producer.

In this way, the network device verifying the access token may be indicated that the access token is not valid anymore, thereby avoiding damage caused from abnormal NF service consumer.

In some example embodiments, an apparatus capable of performing the method 400 (for example, the first device 201) may comprise means for performing the respective steps of the method 400. The means may be implemented in any suitable form. For example, the means may be implemented in a circuitry or software module.

In some example embodiments, the apparatus comprises: means for in response to providing, to a second device, an access token for the second device to access a network function (NF) service from a third device, storing, at a first device, a mapping indicating an association among the access token, the second device and the third device; and means for in response to determining that the second device is abnormal, send, from the first device and to at least one target device based on the mapping, an indication of revoking the access token.

In some example embodiments, the means for sending the indication comprises: means for sending a first indication of ignoring the access token from the second device to at least one of the third device or a proxy verifying the access token from the second device on behalf of the third device.

In some embodiments, the apparatus further comprises: means for receiving a first callback uniform resource identifier (URI) from the third device while the third device registers with the first device, or means for receiving a first callback URI from a proxy verifying the access token from the second device on behalf of the third device while the proxy registers with the first device.

In some embodiments, the means for sending the first indication comprises: means for sending the first indication based on the first callback URI.

In some embodiments, the means for sending the indication comprises: means for sending a second indication that the access token is revoked to at least one of the second device or a service communication proxy requesting the access token from the first device on behalf of the second device.

In some embodiments, the apparatus further comprises: means for receiving, from the second device, a second callback URI while the second device requests the access token from the first device, or means for receiving, from a service communication proxy requesting the access token from the first device on behalf of the second device, a second callback URI while the service communication proxy requests the access token from the first device.

In some embodiments, the means for sending the second indication comprises means for sending the second indication based on the second callback URI.

In some embodiments, the means for sending the indication comprises: means for in response to determining that the access token is generated for a second public land mobile network (PLMN) different from a first PLMN associated with the first device, sending, to a security edge protection proxy associated with the first PLMN, a third indication of blocking traffic (e.g. traffic/message that contains the access token) from the second PLMN.

In some embodiments, the apparatus further comprises: means for performing at least one of: discarding the mapping in response to expiry of the access token, rejecting a further access token request for the second device, or sending an error code in response to receiving a further access token request for the second device.

In some embodiments, means for determining that the second device is abnormal comprises: means for receiving, from a network device, an indication that the second device is abnormal.

In some embodiments, the network device may comprise at least one of: a network data analytics function (NWDAF), a management data analytics service (MDAS), or an operations, administration and maintenance (OAM) function.

In some embodiments, the apparatus further comprises means for performing other steps in some embodiments of the method 400. In some embodiments, the means comprises at least one processor; and at least one memory including computer program code, the at least one memory and computer program code configured to, with the at least one processor, cause the performance of the apparatus.

In some example embodiments, an apparatus capable of performing the method 500 (for example, the second device 202) may comprise means for performing the respective steps of the method 500. The means may be implemented in any suitable form. For example, the means may be implemented in a circuitry or software module.

In some example embodiments, the apparatus comprises: means for sending, from a network device and to a first device, a callback uniform resource identifier (URI); and means for receiving, at the network device and from the first device, an indication that a received access token is revoked based on the callback URI, the access token being previously received for accessing a network function (NF) service.

In some embodiments, the means for sending the callback URI comprises means for while requesting the access token from the first device.

In some embodiments, the network device is a NF service consumer or a service communication proxy requesting the access token on behalf of a NF service consumer.

In some embodiments, the apparatus further comprises means for performing other steps in some embodiments of the method 500. In some embodiments, the means comprises at least one processor; and at least one memory including computer program code, the at least one memory and computer program code configured to, with the at least one processor, cause the performance of the apparatus.

In some example embodiments, an apparatus capable of performing the method 600 (for example, the third device 203) may comprise means for performing the respective steps of the method 600. The means may be implemented in any suitable form. For example, the means may be implemented in a circuitry or software module.

In some example embodiments, the apparatus comprises: means for sending, from a network device and to a first device, a callback uniform resource identifier (URI); and means for receiving, at the network device and from the first device, an indication of ignoring an access token from a second device based on the callback URI, the access token being used for the second device to access a network function (NF) service.

In some embodiments, the means for sending the callback URI comprises means for sending the callback URI while registering with the first device.

In some embodiments, the network device is a NF service producer or a proxy verifying the access token on behalf of a NF service producer.

In some embodiments, the apparatus further comprises means for performing other steps in some embodiments of the method 600. In some embodiments, the means comprises at least one processor; and at least one memory including computer program code, the at least one memory and computer program code configured to, with the at least one processor, cause the performance of the apparatus.

Figure 7:
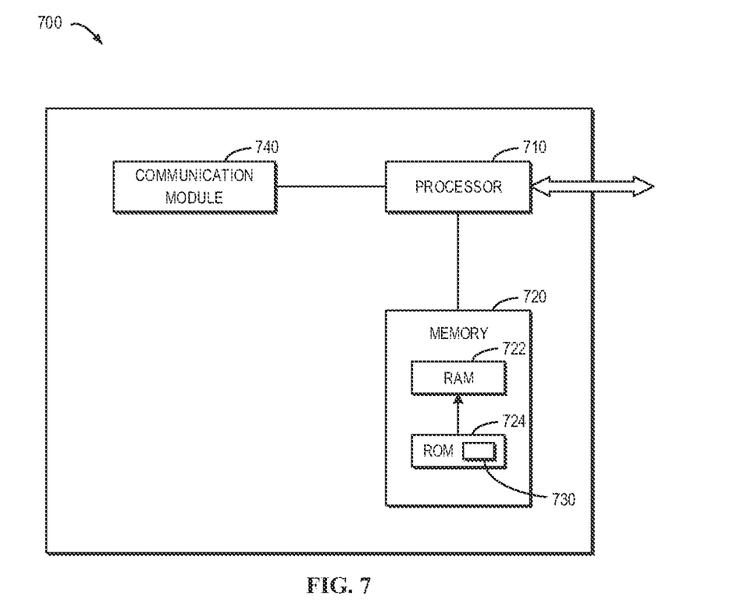
FIG. 7 illustrates a simplified block diagram of a device that is suitable for implementing some example embodiments of the present disclosure.

FIG. 7 illustrates a simplified block diagram of a device 700 that is suitable for implementing some example embodiments of the present disclosure. The device 700 may be provided to implement a network device, e.g., NRF 301, NF service consumer 302, NF service producer 303, Proxy 304 as shown in FIG. 3. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIGS. 2-6. The embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like.

Figure 8:
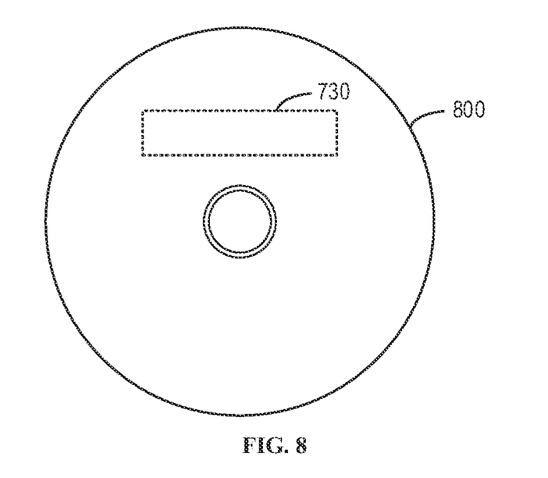
FIG. 8 illustrates a block diagram of an example of a computer readable medium in accordance with some example embodiments of the present disclosure.

FIG. 8 illustrates a block diagram of an example of a computer readable medium 800 in accordance with some example embodiments of the present disclosure. The computer readable medium 800 has the program 730 stored thereon. It is noted that although the computer readable medium 800 is depicted in form of CD or DVD in FIG. 8, the computer readable medium 800 may be in any other form suitable for carry or hold the program 730.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400, 500, and 600 as described above with reference to FIGS. 4-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A device comprising:
   at least one processor; and
   at least one memory storing instructions of a network repository function of a communication network, wherein the instructions when executed by the at least one processor, cause the device at least to perform operations comprising:
      in response to providing, to a network function service consumer of the communication network, an access token for the network function service consumer to use to access a service of a network function service producer, storing a mapping indicating an association among the access token, the network function service consumer, and at least one target; and
      in response to determining that the network function service consumer is abnormal, revoking the access token to be used by the network function service consumer, and sending, to the at least one target based on the mapping, a first indication indicating the access token provided by the network function service consumer is to be ignored by the at least one target, wherein the at least one target comprises at least one of the network function service producer or a proxy of the communication network, wherein the proxy is configured to verify the access token for the network function service producer.

2. The device of claim 1, wherein the operations further comprise:
   receiving, from a network data analytics function (NWDAF), an indication that the network function service consumer is abnormal.

3. The device of claim 1, wherein the operations further comprise:
   receiving a first callback uniform resource identifier (URI) from the network function service producer while the network function service producer registers with the network repository function, or
   receiving the first callback URI from the proxy while the proxy registers with the network repository function device.

4. The device of claim 3, wherein the sending comprises:
   sending the first indication based on the first callback URI.

5. The device of claim 1, wherein the operations further comprise:
   sending a second indication that the access token is revoked to at least one of the network function service consumer or another proxy requesting the access token from the network repository function on behalf of the network function service consumer.

6. The device of claim 5, wherein the operations further comprise:
   receiving, from the network function service consumer, a second callback URI while the network function service consumer requests the access token from the network repository function, or
   receiving, from the other proxy, the second callback URI while the other proxy requests the access token from the network repository function.

7. The device of claim 6, wherein the sending of the second indication comprises:
   sending the second indication based on the second callback URI.

8. The device of claim 1, wherein the operations further comprise:
   in response to determining that the access token is generated for a second public land mobile network (PLMN) different from a first PLMN associated with the network repository function, sending, to a security edge protection proxy associated with the first PLMN, a third indication of blocking traffic from the second PLMN.

9. The device of claim 1, wherein the operations further comprise at least one of:
   discarding the mapping in response to expiry of the access token;
   rejecting a further request for the access token sent by the network function service consumer; or
   sending an error code in response to receiving a further access token request for the network function service consumer.

10. The device of claim 1, wherein the determining that the network function service consumer is abnormal comprises:
    receiving, from a network function, an indication indicating that the network function service consumer is abnormal.

11. The device of claim 10, wherein the network function comprises at least one of:
    a network data analytics function (NWDAF);
    a network function providing a management data analytics service (MDAS); or
    an operations, administration and maintenance (OAM) function.

12. A method of a network repository function of a communication network, the method comprising:
    in response to providing, to a network function service consumer of the communication network, an access token for the network function service consumer to use to access a service from a network function service producer of the communication network, storing, at the network repository function, a mapping indicating an association among the access token, the network function service consumer, and at least one target; and
    in response to determining that the network function service consumer is abnormal, revoking the access token, and sending, from the network repository function and to the at least one target based on the mapping, a first indication indicating the access token provided by the network function service consumer is to be ignored by the at least one target, wherein the at least one target comprises at least one of the network function service producer or a proxy of the communication network, wherein the proxy is configured to verify the access token for the network function service producer.

13. The method of claim 12, further comprising:
    receiving, from a network data analytics function (NWDAF), an indication that the network function service consumer is abnormal.

14. The method of claim 12, further comprising:
receiving a first callback uniform resource identifier (URI) from the network function service producer while the network function service producer registers with the network repository function; or
receiving the first callback URI from the proxy while the proxy registers with the network repository function.

15. The method of claim 14, wherein the sending comprises:
sending the first indication based on the first callback URI.

16. The method of claim 12, further comprising:
sending a second indication that the access token is revoked to at least one of the network function service consumer or another proxy requesting the access token from the network repository function on behalf of the network function service consumer.

17. The method of claim 16, further comprising:
receiving, from the network function service consumer, a second callback URI while the network function service consumer requests the access token from the network repository function; or
receiving, from the other proxy, the second callback URI while the other proxy requests the access token from the network repository function, wherein
the sending of the second indication comprises sending the second indication based on the second callback URI.

18. A device comprising:

at least one processor; and at least one memory storing instructions of a network repository function, wherein when the instructions are executed by the at least one processor, the device is caused to perform operations comprising:

in response to providing, to a network function service consumer, an access token for the network function service consumer to use to access a service of a network function service producer, storing a mapping indicating an association among the access token, the network function service consumer, and the network function service producer;

in response to determining that the network function service consumer is abnormal, sending, to the network function service producer based on the mapping, an indication of revoking the access token; and in response to determining that the access token is generated for a second public land mobile network (PLMN) different from a first PLMN associated with the network repository function, sending, to a security edge protection proxy associated with the first PLMN, an indication of blocking of traffic received from the second PLMN.

* * * * *